United States Patent
Lee

(10) Patent No.: US 11,423,884 B2
(45) Date of Patent: Aug. 23, 2022

(54) DEVICE WITH CONVOLUTIONAL NEURAL NETWORK FOR ACQUIRING MULTIPLE INTENT WORDS, AND METHOD THEREOF

(71) Applicant: LG ELECTRONICS INC., Seoul (KR)

(72) Inventor: Kwangyong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 341 days.

(21) Appl. No.: 16/845,563

(22) Filed: Apr. 10, 2020

(65) Prior Publication Data

US 2021/0134274 A1 May 6, 2021

(30) Foreign Application Priority Data

Oct. 31, 2019 (KR) .................. 10-2019-0138059

(51) Int. Cl.
| | |
|---|---|
| G10L 15/00 | (2013.01) |
| G10L 15/16 | (2006.01) |
| G10L 15/30 | (2013.01) |
| G06F 17/16 | (2006.01) |
| G06N 3/08 | (2006.01) |
| G10L 15/26 | (2006.01) |

(52) U.S. Cl.
CPC .............. *G10L 15/16* (2013.01); *G06F 17/16* (2013.01); *G06N 3/084* (2013.01); *G10L 15/26* (2013.01); *G10L 15/30* (2013.01)

(58) Field of Classification Search
None
See application file for complete search history.

(56) References Cited

U.S. PATENT DOCUMENTS

| | | | |
|---|---|---|---|
| 10,339,921 B2* | 7/2019 | Sainath | G10L 15/34 |
| 10,452,979 B2* | 10/2019 | Park | G06N 3/082 |
| 2018/0350110 A1* | 12/2018 | Cho | G06N 3/04 |
| 2019/0005360 A1* | 1/2019 | Heide | G06N 3/0481 |
| 2020/0364515 A1* | 11/2020 | Heide | G06T 5/003 |
| 2021/0240895 A1* | 8/2021 | Pop | G06T 7/33 |

* cited by examiner

*Primary Examiner* — Satwant K Singh
(74) *Attorney, Agent, or Firm* — Birch, Stewart, Kolasch & Birch, LLP

(57) ABSTRACT

The present disclosure relates to a convolutional-neural-network structure for acquiring intent words, and a speech recognition device and method using the network. the method includes receiving input data generated from speech, performing convolution on the input data and N3 filters each having N2 channels, and acquiring a feature map having N4 pieces of data for each channel, applying max pooling to the N4 pieces of data to acquire a representative value, and acquiring a feature map having N2 pieces of data for each filter, performing concatenation on the feature maps for the respective filters, and acquiring one feature map of an N3×N2 matrix, performing convolution on the feature map of the N3×N2 matrix and a filter of a 1×N3 matrix, and acquiring a feature map of a 1×N2 matrix; and inputting the feature map of the 1×N2 matrix into an artificial neural network, and acquiring at least one intent word.

18 Claims, 9 Drawing Sheets

10　　　　　31　　　　　33　　　　　20

DEVICE WITH CONVOLUTIONAL NEURAL NETWORK FOR ACQUIRING MULTIPLE INTENT WORDS, AND METHOD THEREOF

CROSS REFERENCE TO RELATED APPLICATION

The present application claims priority to Korean Patent Application No. 10-2019-0138059, filed Oct. 31, 2019, the entire contents of which is incorporated herein for all purposes by this reference.

BACKGROUND OF THE INVENTION

Field of the Invention

Various embodiments relate to a convolutional neural network structure for acquiring multiple intent words, and a speech recognition device and method using the convolutional neural network.

Description of the Related Art

For humans, talking by voice is perceived as the most natural and simple way to exchange information. Reflecting this, recently, in robots, vehicles, and various home appliances including refrigerators, washing machines, vacuum cleaners, and the like, a speech recognition device which recognizes talker's speech, understands the talker's intent, and is controlled according thereto has been widely used.

In order to talk with an electronic device by voice, human speech needs to be converted into a code that the electronic device is capable of processing. The speech recognition device is an apparatus for extracting linguistic information from acoustic information contained in the speech and converting a result of extraction into a code that a machine is capable of understanding and responding to.

In order to increase accuracy of speech recognition, speech recognition based on an artificial intelligence technology has been attempted, but there is a limit in recognizing multiple intent words contained in speech so far.

The foregoing is intended merely to aid in the understanding of the background of the present disclosure, and is not intended to mean that the present disclosure falls within the purview of the related art that is already known to those skilled in the art.

SUMMARY OF THE INVENTION

When a user wants to operate a home appliance, the user transmits an input to control the home appliance through multiple key inputs with a variety of intent. Similarly, even when the user wants to operate a home appliance by speech, multiple intent words spoken at once are input to a speech recognition device. Therefore, the speech recognition device needs to accurately recognize the multiple intent words contained in the spoken speech.

Various embodiments of the present disclosure may provide a convolutional neural network structure capable of more accurately classifying the multiple intent words contained in the spoken speech.

Various embodiments of the present disclosure may provide a method of acquiring multiple intent words contained in spoken speech, by using the convolutional neural network structure.

Various embodiments of the present disclosure may provide a speech recognition device based on the convolutional neural network structure capable of classifying multiple intent words.

Various embodiments of the present disclosure may provide an electronic device that includes the speech recognition device and is thus capable of recognizing multiple intent words.

It is to be understood that technical problems to be solved by the present disclosure are not limited to the aforementioned technical problems and other technical problems which are not mentioned will be apparent from the following description to a person with an ordinary skill in the art to which the present disclosure pertains.

According to various embodiments of the present disclosure, a speech recognition device includes a memory and at least one processor, wherein the memory stores a program for speech recognition, and the at least one processor may load the program stored in the memory to execute the program.

According to various embodiments of the present disclosure, an electronic device comprises a microphone configured to receive talker's speech, an audio processor configured to preprocess the talker's speech received from the microphone and at least one processor operatively connected to the audio processor.

According to various embodiments of the present disclosure, the at least one processor is configured to acquire speech data, convert the speech data into text data, convert the text data into embedding data, acquire a feature map having N4 pieces of data for each channel of each filter by performing a convolution operation on the embedding data and N3 filters each composed of N2 channels, acquire a feature map having N2 pieces of data for each filter by applying max pooling to the N4 pieces of data for each channel of each filter so as to acquire a representative value, acquire one feature map represented by an N3×N2 matrix by performing concatenation on the feature maps for the respective filters, acquire a feature map represented by a 1×N2 matrix by performing a convolution operation on the feature map of the N3×N2 matrix and a filter represented by a 1×N3 matrix and acquire at least one intent word by inputting the feature map of the 1×N2 matrix into an artificial neural network.

According to various embodiments of the present disclosure, a speech recognition method comprises receiving input data based on talker's speech, acquiring a feature map having N4 pieces of data for each channel of each filter by performing a convolution operation on the input data and N3 filters each composed of N2 channels, acquiring a feature map having N2 pieces of data for each filter by applying max pooling to the N4 pieces of data for each channel of each filter so as to acquire a representative value, acquiring one feature map represented by an N3×N2 matrix by performing concatenation on the feature maps for the respective filters, acquiring a feature map represented by a 1×N2 matrix by performing a convolution operation on the feature map of the N3×N2 matrix and a filter represented by a 1×N3 matrix and acquiring at least one intent word by inputting the feature map of the 1×N2 matrix into an artificial neural network.

According to various embodiments of the present disclosure, a method of operating an electronic device comprises acquiring speech data, converting the speech data into text data, converting the text data into embedding data, acquiring a feature map having N4 pieces of data for each channel of each filter by performing a convolution operation on the embedding data and N3 filters each composed of N2 channels, acquiring a feature map having N2 pieces of data for each filter by applying max pooling to the N4 pieces of data for each channel of each filter so as to acquire a representative value, acquiring one feature map represented by an N3×N2 matrix by performing concatenation on the feature maps for the respective filters, acquiring a feature map represented by a 1×N2 matrix by performing a convolution operation on the feature map of the N3×N2 matrix and a filter represented by a 1×N3 matrix and acquiring at least one intent word by inputting the feature map of the 1×N2 matrix into an artificial neural network.

According to various embodiments, multiple intent words contained in speech are accurately acquired, so that the electronic device including the speech recognition device is capable of clearly understanding the user's intent and operating accordingly.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
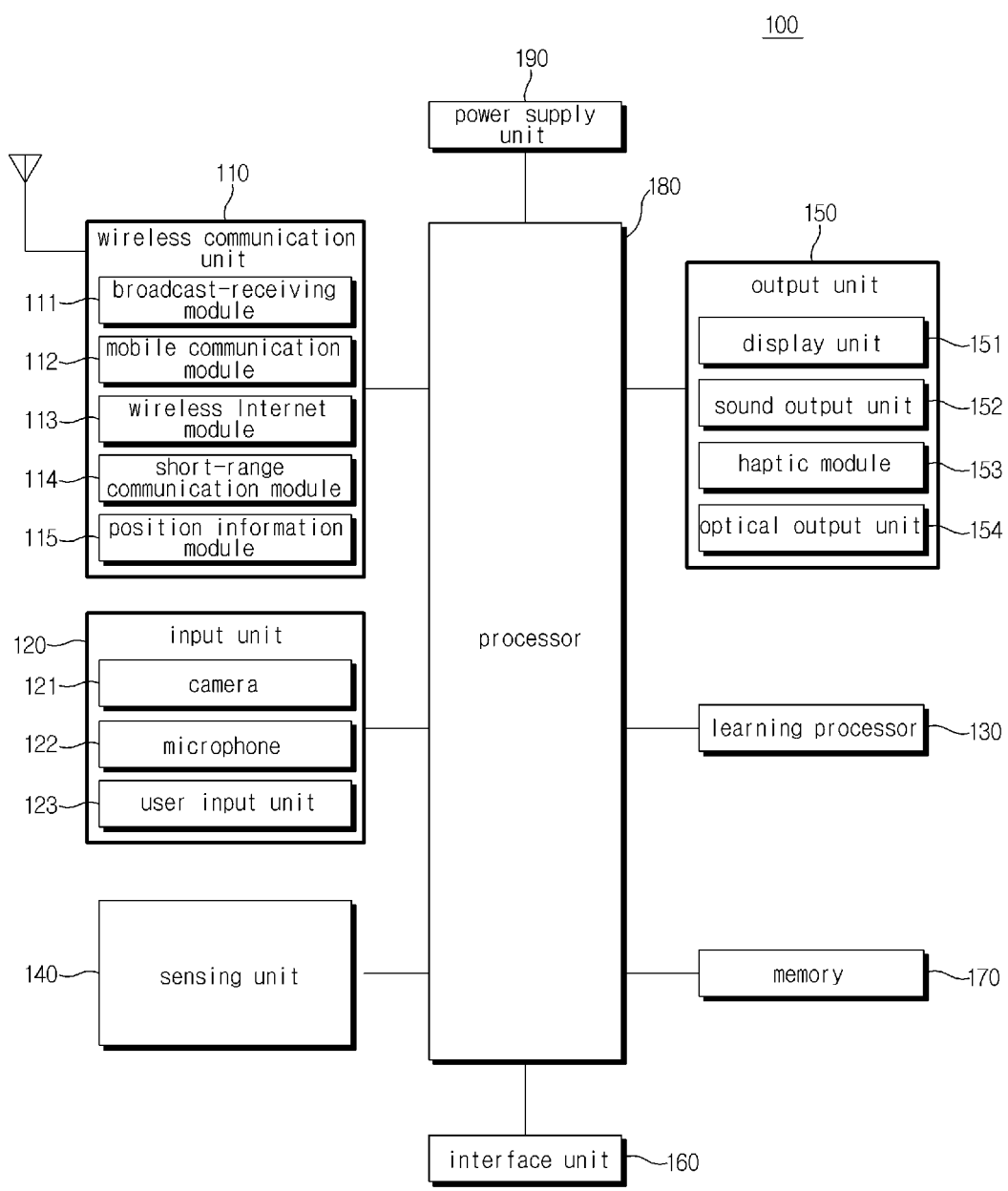
FIG. 1 is a block diagram illustrating a configuration of an electronic device 100 capable of performing a speech recognition function.

Hereinafter, embodiments described in the specification will be described in detail with reference to the accompanying drawings. Regardless of reference numerals, the same or similar elements are denoted by the same reference numerals, and a duplicated description thereof will be omitted.

The suffix "module" or "unit" for the element used in the following description is merely intended to facilitate description of the specification, and the suffix itself does not have a meaning or function distinguished from others. Further, the term "module" or "unit" may refer to a software element or a hardware element such as a field programmable gate array (FPGA), and an application specific integrated circuit (ASIC), and performs particular functions. However, the term "unit" or "module" is not limited to software or hardware. The term "unit" or "module" may be formed so as to be in an addressable storage medium, or may be formed so as to operate one or more processors. Thus, for example, the term "unit" or "module" may refer to elements such as software elements, object-oriented software elements, class elements, and task elements, and may include processes, functions, attributes, procedures, subroutines, segments of program code, drivers, firmware, micro codes, circuits, data, a database, data structures, tables, arrays, and variables. A function provided in the elements and "units" or "modules" may be associated with the smaller number of elements and "units" or "modules", or may be divided into additional elements and "units" or "modules".

The steps of the method or algorithm described in association with several embodiments of the present disclosure may be implemented directly into a hardware module, a software module, or a combination thereof, which are executed by a processor. A software module may be provided in RAM, flash memory, ROM, EPROM, EEPROM, a register, a hard disk, a removable disk, CD-ROM, or any other types of recording medium known in the art. An exemplary storage medium is coupled to the processor such that the processor reads information from the recording medium and writes information to the storage medium. Alternatively, the recording medium may be integrated with the processor. The processor and the recording medium may be provided in an application-specific integrated circuit (ASIC). The ASIC may be provided in a user terminal.

In describing the embodiments described in the specification, if it is decided that the detailed description of the known art related to the present disclosure makes the subject matter of the present disclosure unclear, the detailed description will be omitted. In addition, the accompanying drawings are only to easily understand an embodiment described in the specification. It is to be understood that the technical idea described in the specification is not limited by the accompanying drawings, but includes all modifications, equivalents, and substitutions included in the spirit and the scope of the present disclosure.

Terms including ordinal numbers, such as "first", "second", etc. can be used to describe various elements, but the elements are not to be construed as being limited to the terms. The terms are only used to differentiate one element from other elements.

It will be understood that when an element is referred to as being "coupled" or "connected" to another element, it can be directly coupled or connected to the other element or intervening elements may be present therebetween. In contrast, it will be understood that when an element is referred to as being "directly coupled" or "directly connected" to another element, there are no intervening elements present.

FIG. 1 is a block diagram illustrating a configuration of an electronic device 100 capable of performing a speech recognition function.

The electronic device 100 shown in FIG. 1 may be a mobile electronic device, such as a mobile phone, a smart phone, a laptop computer, an artificial intelligence device for digital broadcasting, a personal digital assistant (PDA), a portable multimedia player (PMP), a navigation device, a slate PC, a tablet PC, Ultrabook, a wearable device (for example, a watch-type artificial intelligence device (smartwatch), a glass-type artificial intelligence device (smart glass), a head-mounted display (HMD)), etc.; or may be a fixed electronic device such as a refrigerator, washing machine, a smart TV, a desktop computer, a digital signage, etc. In addition, the electronic device 100 may be a fixed or movable robot.

The configuration of the electronic device 100 shown in FIG. 1 is an embodiment, and each element may be constructed into one chip, component, or electronic circuit, or into a combination of chips, components, or electronic circuits. According to another embodiment, part of the elements shown in FIG. 1 may be divided into several elements and constructed into different chips, components, or electronic circuits. Alternatively, several elements may be combined to be constructed into one chip, component, or electronic circuit. In addition, according to another embodiment, part of the elements shown in FIG. 1 may be deleted, or an element not shown in FIG. 1 may be added. For example, in the case of a desktop computer, the wireless communication unit 110 shown in FIG. 1 may be omitted, and a wired communication unit for Ethernet and/or LAN may be added.

Referring to FIG. 1, according to various embodiments, the electronic device 100 may include a wireless communication unit 110, an input unit 120, a learning processor 130, a sensing unit 140, an output unit 150, an interface unit 160, a memory 170, a processor 180, and a power supply unit 190.

According to various embodiments, the wireless communication unit 110 may include at least one among a broadcast reception module 111, a mobile communication module 112, a wireless Internet module 113, a short-range communication module 114, and a position information module 115.

The broadcast reception module 111 may receive a broadcast signal and/or broadcast-related information from an external broadcast management server through a broadcast channel.

The mobile communication module 112 may transmit and receive a wireless signal to perform data communication with at least one among a base station, an external terminal, and a server over a mobile communication network that is established according to technical standards or communication methods for mobile communication (for example, The Global System for Mobile communication (GSM), code-division multiple access (CDMA), code-division multiple access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.).

The wireless Internet module 113 refers to a module for wireless Internet access, and may be built in or external to the electronic device 100. The wireless Internet module 113 may transmit and receive wireless signals for data communication over a network according to wireless Internet technologies.

As wireless Internet technologies, for example, there are a wireless LAN (WLAN), Wi-Fi, Wi-Fi Direct, Digital Living Network Alliance (DLNA), wireless broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), etc.

The short-range communication module 114 is for short-range communication and supports short-range communication by using at least one among the following: Bluetooth™, radio-frequency identification (RFID), Infrared Data Association (IrDA), ultra-wideband (UWB), ZigBee, near-field communication (NFC), Wi-Fi, Wi-Fi Direct, Wireless Universal Serial Bus (Wireless USB) technologies.

The position information module 115 is a module for acquiring the position (or current position) of the electronic device 100, and representative examples of the module include a Global Positioning System (GPS) module or a Wi-Fi module. For example, using the GPS module, the electronic device 100 may use a signal transmitted from a GPS satellite to acquire the position of the electronic device 100.

The input unit 120 may include a camera 121 for inputting an image signal, a microphone 122 for receiving an audio signal, and a user input unit 123 for receiving information from a user.

Speech data or image data collected by the input unit 120 may be analyzed to be processed as a user's control command.

The camera 121 processes image frames such as still images, video, or the like acquired by an image sensor in a video call mode or a shooting mode. The processed image frame may be displayed on a display unit 151 or stored in the memory 170.

The microphone 122 processes external sound signals into electrical speech data. The processed speech data may be used in various ways depending on the function performed (or an application program in execution) by the electronic device 100. In the meantime, in the microphone 122, various noise-removal algorithms for removing noise that occurs in the process of receiving an external sound signal may be implemented.

The user input unit 123 is for receiving information from a user. When information is input through the user input unit 123, the processor 180 controls the operation of the electronic device 100 in a manner that corresponds to the input information.

The user input unit 123 may include a touch input means and a mechanical input means (or a mechanical key, for example, a button, a dome switch, a jog wheel, a jog switch, etc. positioned on the front/rear or the side of the electronic device 100). For example, the touch input means may include a virtual key, a soft key, or a visual key displayed on a touch screen through software processing, or may include a touch key placed on a portion other than the touch screen.

The sensing unit 140 may include one or more sensors sensing at least one among information in the electronic device 100, information on a surrounding environment around the electronic device 100, and user information.

For example, the sensing unit 140 may include at least one among a proximity sensor, an illuminance sensor, a touch sensor, an acceleration sensor, a magnetic sensor, a gravity sensor (G-sensor), a gyroscope sensor, a motion sensor, an RGB sensor, an infrared sensor (IR sensor), a finger scan sensor, an ultrasonic sensor, an optical sensor (for example, the camera 121, the microphone 122, a battery gauge, an environmental sensor (for example, a barometer, a hygrometer, a thermometer, a radioactivity sensor, a heat sensor, a gas sensor, etc.), and a chemical sensor (for example, an electronic nose, a healthcare sensor, a biometric sensor, etc.). In the meantime, the electronic device 100 described in this specification may use a combination of information sensed by at least two sensor of these sensors.

The output unit 150 is for generating an output related to visual, auditory, tactile senses, etc. and may include at least one among the display unit 151, a sound output unit 152, a haptic module 153, and an optical output unit 154.

The display unit 151 displays (outputs) information processed by the electronic device 100. For example, the display unit 151 may display execution-screen information of an application program run on the electronic device 100, or User Interface (UI) and Graphic User Interface (GUI) information according to the execution-screen information.

The display unit 151 and a touch sensor may have an inter-layered structure or may be integrated, thereby implementing a touch screen. This touch screen may serve as the user input unit 123 that provides an input interface between the electronic device 100 and the user and provides an output interface between the electronic device 100 and the user.

The sound output unit 152 may output audio data received from the wireless communication unit 110 or stored in the memory 170, in a call signal reception mode, a call mode, a recording mode, a speech recognition mode, broadcast reception mode, or the like.

The sound output unit 152 may include at least one among a receiver, a speaker, and a buzzer.

The haptic module 153 may generate various tactile effects that the user feels. A representative example of the tactile effects generated by the haptic module 153 may be vibration.

The optical output unit 154 outputs a signal for notifying the occurrence of an event, by using light of a light source of the electronic device 100. Examples of the event generated in the electronic device 100 may include receiving a message, receiving a call signal, a missed call, an alarm, schedule notification, receiving an email, receiving information through an application, and the like.

The interface unit 160 serves as a passage to various types of external devices connected to the electronic device 100. The interface unit 160 may include at least one among a wired/wireless headset port, an external-charger port, a wired/wireless data port, a memory card port, a port connecting a device equipped with an identification module, an audio input/output (I/O) port, a video input/output (I/O) port, and an earphone port. In the electronic device 100, in response to connection between an external device and the interface unit 160, appropriate control related to the connected external device may be performed.

In the meantime, the identification module is a chip storing various types of information for authenticating the use authority of the electronic device 100, and may include a user identify module (UIM), a subscriber identity module (SIM), a universal subscriber identity module (USIM), or the like. A device (hereinafter, referred to as an "identification device") equipped with the identification module may be manufactured in a form of a smart card. Therefore, the identification device may be connected to the electronic device 100 through the interface unit 160.

The memory 170 may store data supporting various functions of the electronic device 100. The memory 170 may store a number of application programs or applications running on the electronic device 100, data for operation of the electronic device 100, commands, and data (for example, at least one algorithm information for machine running, etc.) for operation of the learning processor 130.

Under the control of the processor 180, the power supply unit 190 may receive external power or internal power to supply the power to the elements included in the electronic device 100. The power supply unit 190 may include a battery, and the battery may be a built-in battery or a replaceable battery.

The processor 180 may determine or predict, on the basis of information determined or generated by using a data analysis and a machine running algorithm, at least one executable operation of the electronic device 100. To this end, the processor 180 may request, find, receive, or use data of the learning processor 130, and may control the electronic device 100 so that a predicted operation or an operation determined to be preferable, of the at least one executable operation is performed.

The processor 180 may perform various functions for implementing intelligent emulation (specifically, a knowledge-based system, an inference system, and a knowledge acquisition system). This may be applied to various types of systems (for example, a fuzzy logic system) including an adaptive system, a machine running system, an artificial neural network, and the like.

The processor 180 may also include a sub-module that enables an operation accompanied by speech and natural language speech processing, such as an I/O processing module, an environment condition module, a speech-to-text (STT) processing module, a natural language processing (NLP) module, a workflow processing module, and a service processing module.

Each of the sub-modules may have access to one or more systems or data and models at the electronic device 100, or a subset or superset thereof. Further, each of the sub-modules may provide various functions including a vocabulary index, user data, a workflow model, a service model, and an automatic speech recognition (ASR) system.

In another embodiment, another aspect of the processor 180 or the electronic device 100 may be implemented with the sub-module, system, or data and model.

In some examples, using data of the learning processor 130, the processor 180 may be configured to detect and sense requirements on the basis of the user's intent or a contextual condition expressed in a user input or a natural language input.

The processor 180 may actively elicit and acquire information required to fully determine the requirements on the basis of the contextual condition or the user's intent. For example, the processor 180 may actively elicit information required to determine the requirements, by analyzing historical data that includes historical input and output, pattern matching, unambiguous words, input intent, etc.

The processor 180 may determine a flow of operations for executing a function that responds to the requirements on the basis of the contextual condition or the user's intent.

The processor 180 may be configured to collect, sense, extract, detect, and/or receive a signal or data used for a data analysis and machine running operation, through one or more sensing components in the electronic device 100, in order to collect information for processing and stored at the learning processor 130.

Collection of information may include sensing information through a sensor, extracting information stored in the memory 170, or receiving information from another electronic device, entity, or external storage device through a communication means.

The processor 180 may collect and store use history information of the electronic device 100.

The processor 180 may use the stored use history information and predictive modeling to determine the best match for performing a particular function.

The processor 180 may receive or detect the information on the surrounding environment or other types of information through the sensing unit 140.

The processor 180 may receive a broadcast signal and/or broadcast-related information, a wireless signal, and wireless data and may communicate with an external electronic device through the wireless communication unit 110.

The processor 180 may receive image information (or a signal corresponding thereto), audio information (or a signal corresponding thereto), data, or user input information from the input unit 120.

The processor 180 may collect information in real time, may process or classify information (for example, a knowledge graph, a command policy, a personalization database, a dialogue engine, etc.), and may store the processed information in the memory 170 or the learning processor 130.

When the operation of the electronic device 100 is determined on the basis of a data analysis, and machine running algorithm and technology, the processor 180 controls the elements of the electronic device 100 so as to execute the determined operation. The processor 180 may then perform the operation that is determined by controlling the electronic device 100 according to a control command.

When a particular operation is performed, the processor 180 analyzes history information indicating execution of the particular operation through a data analysis and machine running algorithm and technique, and updates the previously-learned information on the basis of the analyzed information.

Accordingly, the processor 180, in combination with the learning processor 130, may enhance, on the basis of the updated information, the accuracy of future performance of the data analysis and the machine running algorithm and technique.

Generally, the processor 180 controls the overall operation of the electronic device 100, in addition to the operations related to the application program. For example, when a state of the electronic device 100 meets a set condition, the processor 180 may set a lock state in which input of the user's control command to applications is limited, or may stop the lock state.

The processor 180 may process input or output signals, data, information, etc. or may execute the application program stored in the memory 170 through the above-described elements, thereby providing or processing information or a function appropriate for the user.

In addition, the processor 180 may control at least part of the elements shown in FIG. 1, so as to run the application program stored in the memory 170. Further, the processor 180 may operate at least two of the elements included in the electronic device 100 in combination so as to operate the application program.

The learning processor 130 may be configured to receive, classify, store, and output information to be used for data mining, a data analysis, intelligent decision making, and machine running algorithm and technology.

The learning processor 130 may include one or more memory units configured to store data that is received, detected, sensed, generated, predefined, or differently output by the electronic device 100; or data that is received, detected, sensed, generated, predefined, or differently output by another component, device, electronic device, or a device communicating with the electronic device.

The learning processor 130 may be integrated in the electronic device 100 or may include a memory implemented therein. In some embodiments, the learning processor 130 may be implemented by using the memory 170.

Alternatively or additionally, the learning processor 130 may be implemented by using a memory related to the electronic device 100, such as an external memory directly combined to the electronic device 100 or a memory maintained at a server communicating with the electronic device 100.

In another embodiment, the learning processor 130 may be implemented by using a memory maintained in a cloud computing environment, or other remote memory location that is accessible by the electronic device 100 through a communication method, such as a network.

Generally, the learning processor 130 may be configured to store data in one or more databases to identify, index, categorize, manipulate, store, find, and output for use in supervised learning, unsupervised learning, reinforcement learning, data mining, a predictive analysis, or other electronic devices.

The information stored by the learning processor 130 may be used by the processor 180 or one or more controllers of the electronic device 100, using any of different types of data analysis algorithms and machine running algorithms.

Examples of such algorithms includes a k-nearest neighbor system, fuzzy logic (for example, possibility theory), a neural network, a Boltzmann machine, vector quantization, a pulsed neural network, a support vector machine, a maximum margin classifier, hill climbing, an inductive logic system, a Bayesian network, a Petri net (for example, a finite state machine, a mealy machine, and a Moore finite state machine), a classifier tree (for example: a perceptron tree, a support vector tree, a Markov tree, a decision tree forest, and a random forest), pandemonium model and system, artificial fusion, sensor fusion, image fusion, reinforcement learning, augmented reality, pattern recognition, automated planning, etc.

The learning processor 130 may store, in memory, an artificial neural network (ANN) model used in a machine running algorithm, may generate a learning model in which the artificial neural network model is learned to store the learning model in memory, and may perform tasks such as classification, detection, and recognition on the basis of data input by using the learning model.

Artificial intelligence refers to the field of researching artificial intelligence or the methodology to create the same, and machine learning refers to the field of defining various problems in the field of artificial intelligence and researching the methodology for solving the problems. Machine learning is defined as an algorithm that improves the performance of an operation by performing a consistent experience for the operation.

An artificial neural network (ANN) is a model used in machine learning, configured with artificial neurons (nodes) constituting a network in a synapse coupling, and means a model with problem solving ability. The artificial neural network may be defined by a connection pattern between neurons of other layers, a learning process of updating a model parameter, and an activation function generating an output value.

Figure 2:
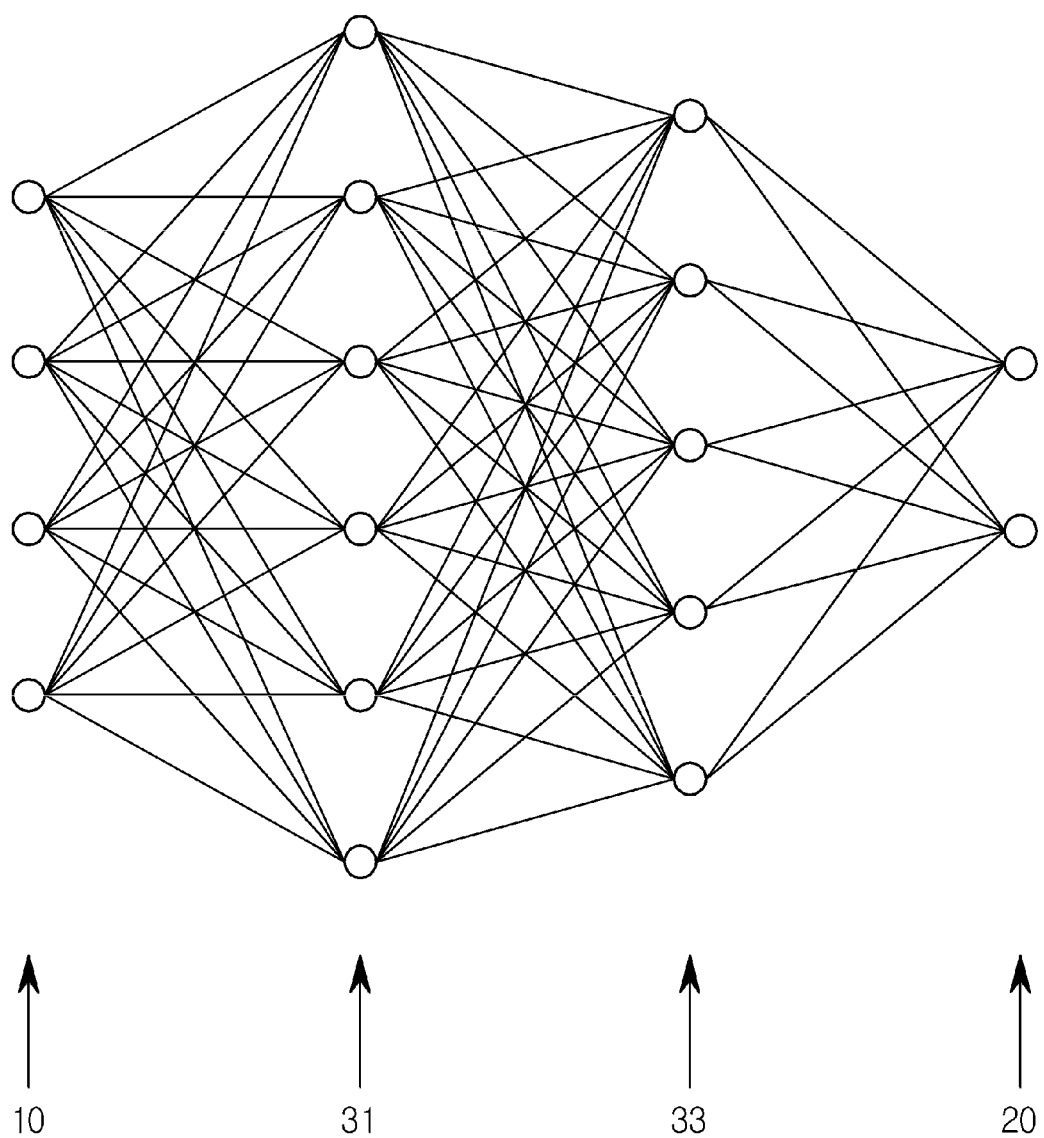
FIG. 2 is a diagram illustrating an example of a fully-connected artificial neural network structure.

FIG. 2 is a diagram illustrating an example of a fully-connected artificial neural network structure.

Referring to FIG. 2, the artificial neural network may include an input layer 10, an output layer 20, and selectively one or more hidden layers 31 and 33. Each layer may include one or more nodes corresponding to neurons of the neural network, and the artificial neural network may include a synapse connecting a node of one layer and a node of another layer. In the artificial neural network, the node may receive input signals that are input through the synapse, and may generate an output value on the basis of an activation function with respect to a weight for each of the input signals and a bias. The output value of each node may serve as an input signal to the subsequent layer through the synapse. An artificial neural network in which all nodes of one layer are connected to all nodes of the subsequent layer through synapses may be referred to as a fully-connected artificial neural network.

The model parameter of the artificial neural network refers to a parameter determined through learning, and may include a weight of a synapse connection, a bias of a neuron, etc. In addition, a hyperparameter refers to a parameter that has to be set before performing learning in a machine learning algorithm, and may include a learning rate, a number of repetition times, a size of a mini-batch, an initialization function, etc.

Machine learning, among artificial neural networks, employed in a deep neural network (DNN) including a plurality of hidden layers, is referred to as deep learning, and the deep learning is a part of the machine learning. Hereinafter, machine learning may be used as including deep learning.

Figure 3:
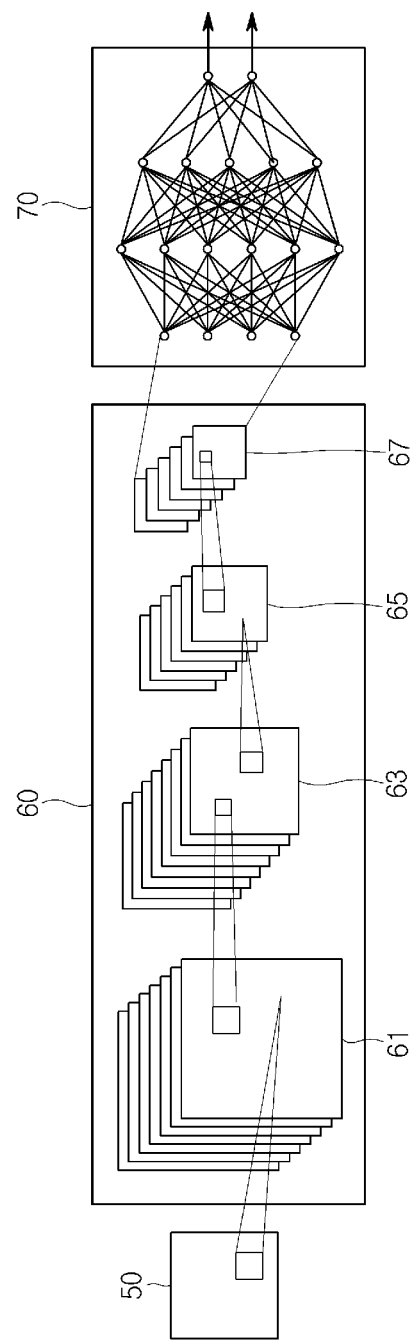
FIG. 3 is a diagram illustrating an example of a convolutional neural network (CNN) structure that is a type of deep neural network.

FIG. 3 is a diagram illustrating an example of a convolutional neural network (CNN) structure that is a type of deep neural network.

In identifying structural space data such as images, videos, and text strings, the convolutional neural network structure shown in FIG. 3 may be more effective. The convolutional neural network maintains spatial information of an image and effectively recognizes a feature with a nearby image simultaneously.

Referring to FIG. 3, the convolutional neural network includes a feature extraction layer 60 and a classification layer 70. The feature extraction layer 60 extracts a feature of an image by performing convolution on spatially nearby pieces of the image.

The feature extraction layer 60 may be constructed in the form of multiple convolutional layers 61 and 65 and pooling layers 63 and 67 stacked. The convolutional layers 61 and 65 may be results of applying a filter to input data and then applying an activation function. The convolutional layers 61 and 65 may include multiple channels, and the channels may be results of applying different filters and/or different activation functions. The result of the convolutional layers 61 and 65 may be a feature map. The feature map may be data in the form of a two-dimensional matrix. The pooling layers 63 and 67 may be used to receive output data of the convolutional layers 61 and 65, in other words, the feature map so as to reduce the size of the output data or to emphasis particular data. The pooling layers 63 and 67 may generate output data by applying a function of the following: max pooling in which the maximum value is selected from part of the output data of the convolutional layers 61 and 65; average pooling in which the average value is selected; and min pooling in which the minimum value is selected.

The feature maps generated through a series of the convolutional layers and the pooling layers may become smaller little by little. The final feature map generated through the last convolutional layer and pooling layer may be converted into a one-dimensional form and may be input to the classification layer 70. The classification layer 70 may be the fully-connected artificial neural network structure shown in FIG. 2. The number of input nodes of the classification layer 70 is equal to a value obtained by multiplying the number of elements in the matrix of the final feature map and the number of channels.

In addition to the above-described convolutional neural network, a recurrent neural network (RNN), a long short-term memory (LSTM) network, gated recurrent units (GRUs), or the like may be used as the deep neural network structure. The recurrent neural network is capable of performing classification and prediction by learning sequential data, and is a structure that has a recurrent structure therein and learning at the past time is multiplied by a weight and a result thereof is reflected to current learning. Accordingly, the current output result is influenced by the output result from the past time, and the hidden layer performs a type of memory function. The recurrent neural network may be used for performing machine translation by analyzing speech waveforms, for generating text by understanding the components before and after the sentence of text, or for speech recognition.

An objective of performing learning for an artificial neural network is to determine a model parameter that minimizes a loss function. The loss function may be used as an index for determining an optimum model parameter in a learning process of the artificial neural network. In the case of the fully-connected artificial neural network, a weight of each synapse may be determined by learning. In the case of the convolutional neural network, a filter of the convolutional layer for extracting the feature map may be determined by learning.

Machine learning may be classified into supervised learning, unsupervised learning, and reinforcement learning according to a learning method.

Supervised learning may refer to a method of performing learning for an artificial neural network where a label related to learning data is provided, and the label may refer to a right answer (or result value) that has to be estimated by the artificial neural network when the learning data is input to the artificial neural network. Unsupervised learning may refer to a method of performing learning for an artificial neural network where a label related to learning data is not provided. Reinforcement learning may refer to a learning method performing learning so as to select, by an agent defined under a certain environment, an action or an order thereof such that an accumulated reward in each state is maximized.

Speech recognition processing using an artificial intelligence technology may require a large amount of memory and high computing power. According to an embodiment, when the electronic device 100 has insufficient computing power to process speech recognition, an external server is used to perform speech recognition processing.

Figure 4:
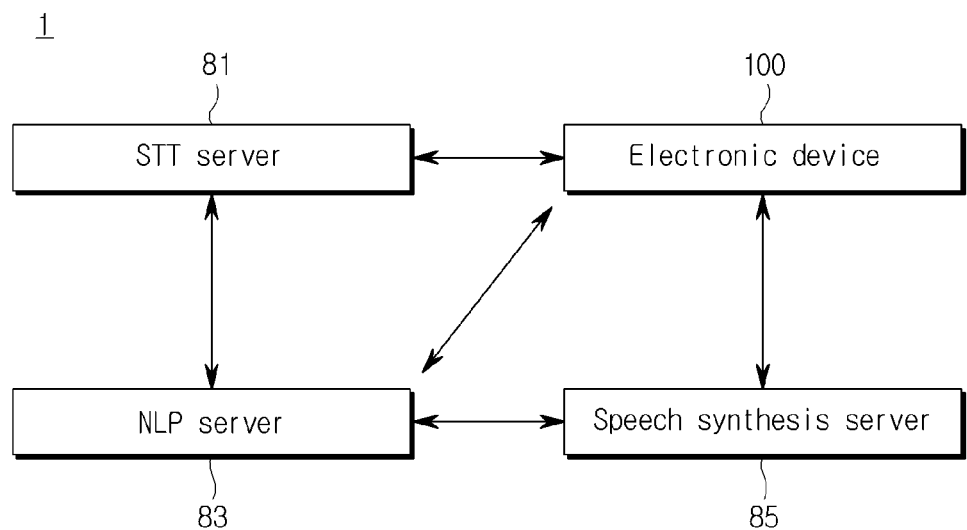
FIG. 4 is a diagram illustrating a speech system 1 according to various embodiments.

FIG. 4 is a diagram illustrating a speech system 1 according to various embodiments.

Referring to FIG. 4, the speech system 1 may include an electronic device 100, a speech-to-text (STT) conversion server 81, a natural language processing (NLP) server 83, and a speech synthesis server 85.

The electronic device 100 may transmit speech data to the STT server 81.

The STT server 81 may convert the speech data received from the electronic device 100 into text data.

The STT server 81 may increase the accuracy of speech-to-text conversion by using a language model.

The language model may refer to a model that is capable of calculating the probability of a sentence, or is capable of calculating, when the preceding words are given, the probability that the following word will appear.

For example, the language model may include a probabilistic language models, such as a unigram model, a bigram model, a n-gram model, and the like.

The unigram model is a model in which it is assumed that use of all words is completely independent of each other, and the probability of a sequence of words is calculated as the product of the probabilities of the respective words.

The bigram model is a model in which it is assumed that use of words depends only on preceding one word.

The n-gram model is a model in which it is assumed that use of words depends on the preceding n−1 words.

The STT server 81 may determine whether the text data converted from the speech data is properly converted, by using the language model, thereby increasing the accuracy of conversion into text data.

The STT server 81 may additionally convert each character or word of the text data into N1-dimensional embedding data. The embedding data is a result of expressing a character or word as a vector having N1 real numbers. Converting a character or word into N1-dimensional embedding data may be referred to as word embedding. According to an embodiment, word embedding may be performed using conventional algorithms such as one-hot encoding, word2vec, and GloVe.

The NLP server 83 may receive the text data from the STT server 81. The NLP server 83 may conduct, on the basis of the received text data, an intent analysis on the text data.

The NLP server 83 may transmit, to the electronic device 100, intent analysis information representing a result of performing the intent analysis.

The NLP server 83 may perform, on the text data, a morphological analysis operation, a syntactic analysis operation, a speech act analysis operation, and a dialogue processing operation, and may than generate the intent analysis information.

The morphological analysis operation is an operation of classifying text data corresponding to speech spoken by the user into morphemes, which are smallest meaningful units, and determining which part of speech each of the morphemes is.

The syntactic analysis operation is an operation of classifying the text data into noun phrases, verb phrases, adjective phrases, and the like, by using a result of the morphological analysis operation, and determining what relationship present between each of the phrases.

Through the syntactic analysis operation, the subject, object, modifiers of speech spoken by the user may be determined.

The speech act analysis operation is an operation of analyzing the intent of speech spoken by the user, by using a result of the syntactic analysis operation. Specifically, the speech act analysis operation may be an operation of determining intent of the sentence, such as whether the user asks a question, makes a request, or expresses a simple emotion.

The dialogue processing operation may be an operation of determining, by using a result of the speech act analysis operation, whether to answer the user's speaking, to respond, or ask a question about additional information.

After the dialogue processing, the NLP server 83 may generate the intent analysis information including one or more among the answer to the intent of user's speech, the response, the question about the additional information.

In the meantime, the NLP server 83 may receive the text data from the electronic device 100. For example, in the case where the electronic device 100 supports the speech-to-text conversion function, the electronic device 100 may convert speech data into text data and may transmit the text data to the NLP server 83. Herein, the text data may be the embedding data.

The speech synthesis server 85 may combine pre-stored pieces of speech data, thereby generating synthesized speech.

The speech synthesis server 85 may record speech of a person who is selected as a model, and may divide the recorded speech into syllables or words. The speech synthesis server 85 may store, on a per-syllable or word basis, the divided speech in an internal or external database.

The speech synthesis server 85 may search the database for the syllables or words corresponding to the given text data, and may synthesize combinations of the found syllables or words, thereby generating the synthesized speech.

The speech synthesis server 85 may have multiple speech language groups stored therein which correspond to multiple languages, respectively.

For example, the speech synthesis server 85 may include a first speech language group recorded in Korean, and a second speech language group recorded in English.

The speech synthesis server 85 may translate text data in a first language into text in a second language, and may generate synthesized speech corresponding to the text in the second language by using the second speech language group.

The speech synthesis server 85 may transmit the generated synthesized speech to the electronic device 100.

The speech synthesis server 85 may receive the intent analysis information from the NLP server 83.

The speech synthesis server 85 may generate, on the basis of the intent analysis information, the synthesized speech reflecting the user's intent.

In an embodiment, the STT server 81, the NLP server 83, and the speech synthesis server 85 may be implemented as one server.

The above-described functions of the STT server 81, the NLP server 83, and the speech synthesis server 85 may be performed in the electronic device 100. To this end, the electronic device 100 may include multiple processors.

Figure 5:
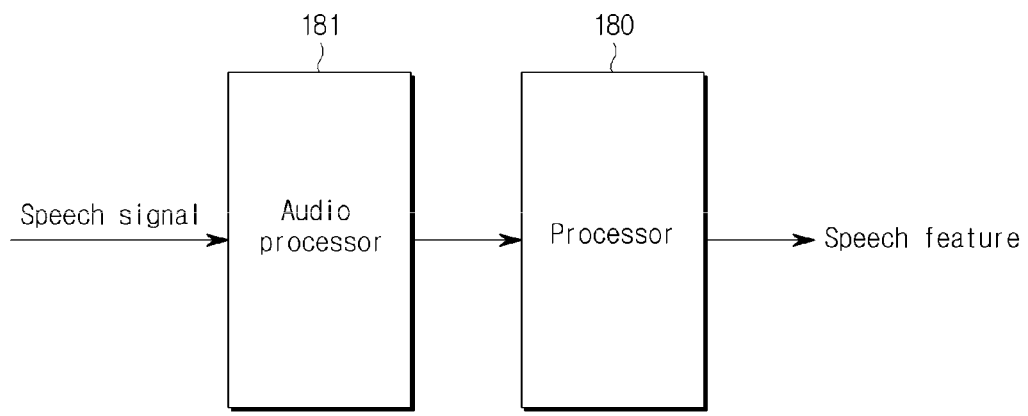
FIG. 5 is a diagram illustrating a process of extracting a user's speech feature from a speech signal, according to various embodiments.

FIG. 5 is a diagram illustrating a process of extracting a user's speech feature from a speech signal, according to various embodiments.

The electronic device 100 shown in FIG. 1 may further include an audio processor 181.

The audio processor 181 may be implemented as a chip separate from the processor 180 or may be implemented as a chip included in the processor 180.

The audio processor 181 may remove noise from the speech signal.

The audio processor 181 may convert the speech signal into text data. To this end, the audio processor 181 may include an STT engine.

The audio processor 181 may recognize an activation word for activating speech recognition by the electronic device 100. The audio processor 181 may convert the activation word received through the microphone 122 into text data, and when the text data is text data corresponding to a pre-stored activation word, the audio processor 181 determines that the activation word is recognized.

The audio processor 181 may convert the speech signal from which noise is removed, into a power spectrum.

The power spectrum may be a parameter indicating what frequency component is contained in a waveform of a time-varying speech signal, and how large the frequency component is.

The power spectrum shows the distribution of the squares of amplitudes according to the frequency of the waveform of the speech signal.

This will be described with reference to FIG. 6.

Figure 6:
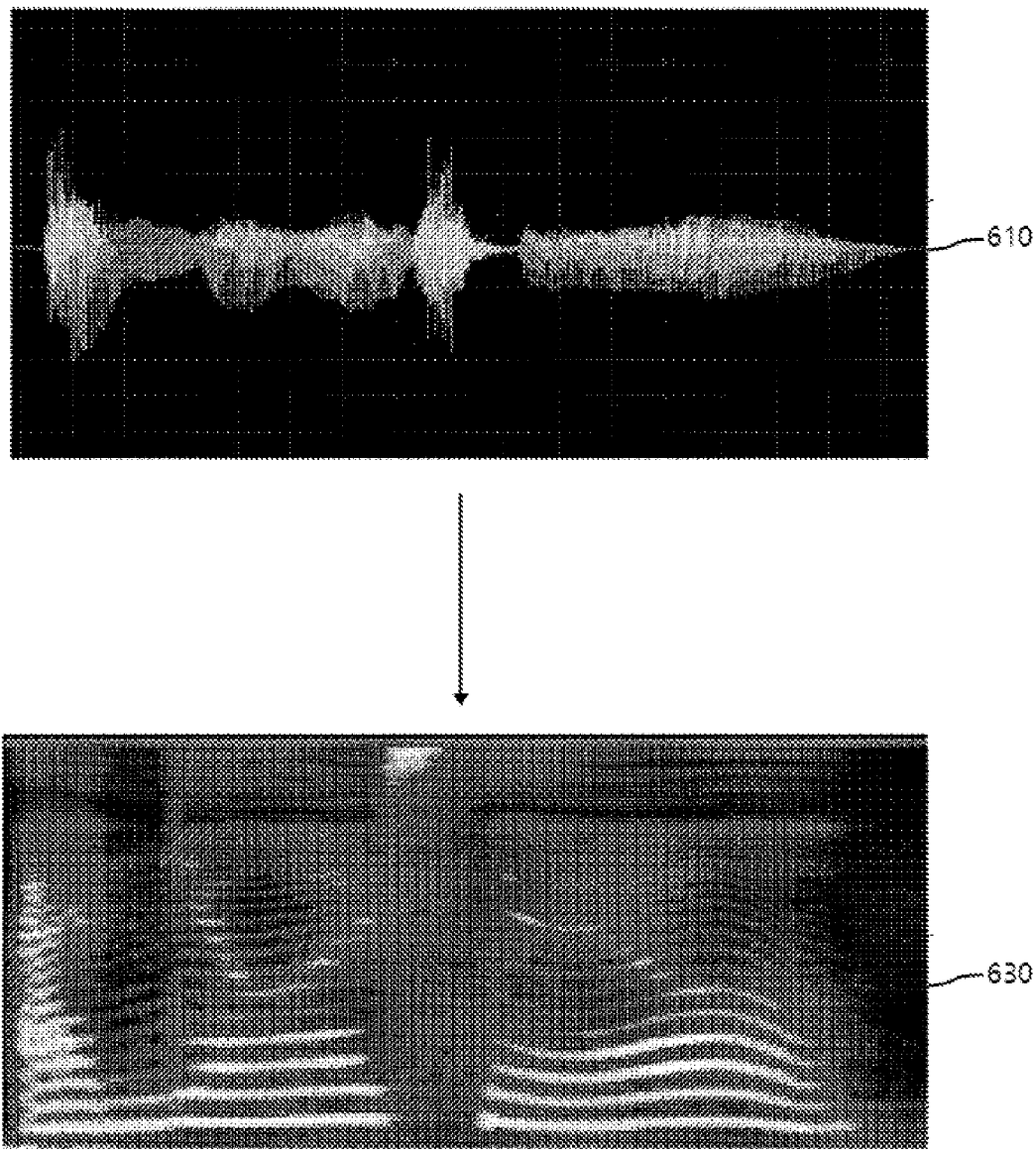
FIG. 6 is a diagram illustrating an example in which a speech signal is converted into a power spectrum, according to an embodiment.

FIG. 6 is a diagram illustrating an example in which a speech signal is converted into a power spectrum, according to an embodiment.

FIG. 6 shows a speech signal 610. The speech signal 610 may be received through the microphone 122, or may be pre-stored in the memory 170.

The x-axis of the speech signal 610 denotes time, and the y-axis denotes the size of amplitude.

The audio processor 181 may convert the speech signal 610 of which the x-axis is a time axis, into a power spectrum 630 of which the x-axis is a frequency axis.

The audio processor 181 may convert the speech signal 610 into the power spectrum 630 by using a fast Fourier transform (FFT).

The x-axis of the power spectrum 630 denotes frequency, and the y-axis denotes the square of amplitude.

Referring back to FIG. 5, the processor 180 may determine a user's speech feature by using at least one among the speech signal 610 and the power spectrum 630 that are transmitted from the audio processor 181.

The user's speech feature may include the user's gender, the height of user's voice, the tone of user's voice, the user's speech topic, the user's speech rate, the volume of user's voice, and the like.

The processor 180 may acquire the frequency of the speech signal 610 and the amplitude corresponding to the frequency, by using the power spectrum 630.

The processor 180 may determine the gender of the user who makes the speech, by using a frequency band of the power spectrum 630.

For example, when the frequency band of the power spectrum 630 is within a preset first frequency band range, the processor 180 determines that the user's gender is a male.

When the frequency band of the power spectrum 630 is within a preset second frequency band range, the processor 180 determines that the user's gender is a female. Herein, the second frequency band range may be a frequency band range higher than the first frequency band range.

The processor 180 may determine the height of speech, by using the frequency band of the power spectrum 630.

For example, the processor 180 may determine, within a particular frequency band range, the height of voice according to the size of amplitude.

The processor 180 may determine the tone of user's voice by using the frequency band of the power spectrum 630. For example, among the frequency bands of the power spectrum 630, the processor 180 may determine the frequency band in which the size of amplitude is equal to or greater than a predetermined size, as a main vocal range of the user, and may determine the determined main vocal range as the tone of user's voice.

The processor 180 may determine, from the text data that is a result of conversion, the user's speech rate through the number of syllables spoken per unit time.

The processor 180 may determine, with respect to the text data that is a result of conversion, the user's speech topic by using a bag-of-words (BOW) model technique.

The BOW model technique is a technique of extracting a frequently used word on the basis of the frequency of words in a sentence. Specifically, the BOW model technique is a technique in which unique words within a sentence are extracted and the frequencies of the extracted words are expressed as vectors, so that the feature of the speech topic is determined.

For example, when the word, for example, "running", "stamina", and the like, frequently appears in the text data, the processor 180 classifies the user's speech topic as exercise.

The processor 180 may determine the user's speech topic from the text data, by using a text categorization technique. The processor 180 may determine the user's speech topic by extracting a keyword from the text data.

The processor 180 may determine the volume of user's voice, considering information on the amplitude in the entire frequency band.

For example, the processor 180 may determine the volume of user's voice on the basis of an average or weighted average of amplitudes in each frequency band of the power spectrum.

The functions of the audio processor 181 and the processor 180 shown in FIG. 5 may be performed in any one server among the STT server 81, the NLP server 83, and the speech synthesis server 85.

For example, the NLP server 83 may extract a power spectrum by using a speech signal, and may then determine the user's speech feature by using the extracted power spectrum.

Figure 7:
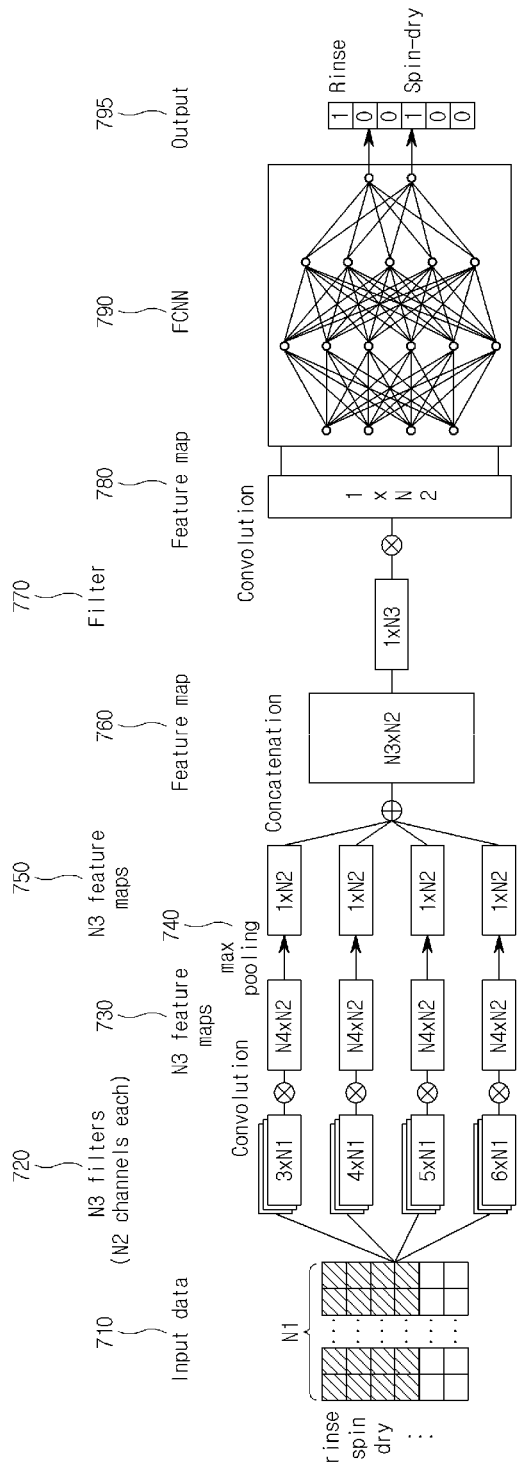
FIG. 7 is a diagram illustrating a convolutional neural network structure for acquiring multiple intent words, according to various embodiments.

FIG. 7 is a diagram illustrating a convolutional neural network structure for acquiring multiple intent words, according to various embodiments. The structure of FIG. 7 may be implemented by a software algorithm and may be executed by the processor 180 and/or the learning processor 130 of FIG. 1 or the NLP server 83 of FIG. 4.

Referring to FIG. 7, the convolutional neural network for acquiring multiple intent words may be speech data (for example, "rinse and spin-dry") spoken by the talker as input data 710. Each character of the speech data may be represented by N1 (for example, 50 or 100)-dimensional embedding data that is expressed by a matrix of N1 real numbers. The embedding data for each character may be acquired by performing learning using a separate artificial neural network model, or may be a value acquired from a result of an artificial neural network model in which learning is already performed.

According to an embodiment, the input data 710 may be represented by an N4×N1 (for example, 256×100) matrix. As shown in FIG. 7, each row may refer to embedding data for one character. When the number of characters acquired from the speech spoken by the user is less than N4, an N4×N1 matrix is generated through zero padding.

According to various embodiments, in order to acquire a feature map from the input data 710, N3 (for example, four) filters 720 may be used. Each of the filters may have N2 (for example, 64, and 128) channels. Each filter may have channels that have the same matrix size and different matrix values, specifically, weights by which the input data is multiplied when performing convolution. In the embodiment of FIG. 7, four filters are used, and the size of each of the filters may be 3×N1, 4×N1, 5×N1, or 6×N1. Herein, N1 denotes a dimension of the embedding data representing one character. Each filter may have N2 channels of which the sizes are the same and weights are different from each other. Filter coefficients (weights) that the N2 channels respectively have may be learned to detect different local features from the input data in order to acquire multiple intent words.

According to various embodiments, with respect to the input data 710, each channel of each filter may be subjected to convolution. Convolution is performed on each channel and the input data 710, so that N4 (for example, 256) results of calculation are acquired. As the filter having N2 channels is applied to the input data, N2 feature maps may be acquired for each filter. The feature map for each channel may be represented by a matrix of N4 values. According to another embodiment, with respect to one filter, a feature map consisting of an N4×N2 matrix may be acquired. Accordingly, when N3 filters are used, N3 feature maps 730, which may be represented by an N4×N2 (for example, 256×128) matrix each, are acquired through a convolution operation.

According to various embodiments, max pooling 740 that finds, as a representative value, the maximum value among N4 values of the feature map for each of the N2 channels of each filter may be used to reduce the number of values representing features of the feature map. Through the max pooling 740, one representative value for each channel of each filter may be acquired. Accordingly, a feature map 750 of a 1×N2 matrix may be acquired with respect to each of N3 filters.

According to various embodiments, the feature maps acquired by using the N3 filters are subjected to concatenation, thereby acquiring a feature map 760 of an N3×N2 matrix. In addition, in order to combine the features acquired by the N3 filters, convolution is performed on a 1×N3-size filter 770 so that a 1×N2 feature map 780 may be acquired.

According to various embodiments, the extracted 1×N2 feature map 780 is used as an input into a fully-connected artificial neural network 790 as shown in FIG. 2, and an output of the fully-connected artificial neural network 790 may refer to multiple intent words. Herein, the intent word may be a speech language that enables, when a particular word is recognized, the electronic device 100 to perform a control command accordingly. In the embodiment of FIG. 7, "rinse", and "spin-dry" may be intent words. In addition, according to an embodiment, a speech language capable of replacing a key input for controlling the electronic device may be the intent word. For example, in the case of a washing machine, the words "power", "course", "wash", "rinse", "spin-dry", "water temperature", "speed wash", and "quiet" capable of performing setting by using a key may be the intent word.

In the above-described structure, unlike the conventional convolutional neural network, the features acquired by the N2 channels of each filter are maintained without being combined with each other, and are used as an input into the fully-connected artificial neural network 790. Thus, in the case where each channel is subjected to learning to acquire a local feature of input data, for example, information when only three characters or four characters are examined from information of the entire input sentence, multiple intent words may be acquired with higher accuracy. Referring to the embodiment of FIG. 7, part of the N2 channels may be subjected to learning to acquire a feature for "rinse" from the input data, and the other part of the N2 channels may be subjected to learning to acquire a feature for "spin-dry" from the input data. Then, the features acquired by the respective channels are maintained without being combined with each other, so that it is recognized that the intent words are spoken.

In the convolutional neural network according to the above-described structure, while examining the features of the entire input data with an arbitrary filter, the initial channel information is maintained without combining channels in the last layer, thereby concentrating on particular keywords or characters that are more local than those in the conventional convolutional neural network. Accordingly, this is optimized for classification of multiple intent words which is highly dependent on a particular word or character.

The convolutional neural network model shown in FIG. 7 may determine weight values of the N2 channels that each of the N3 filters 720 has, through learning. In addition, a weight value of the filter 770 for combining the feature maps generated by the N3 filters 720 may also be determined through learning, and a connection weight value between each of nodes of the fully-connected neural network 790 for classification may also be determined through learning. Learning may be performed through supervised learning in which embedding data of speech containing multiple intent words is used as learning data. Through forward and backward error propagation with supervised learning, each of the weight values may be determined.

Table 1 below shows a comparison between the conventional convolutional neural network structure and the convolutional neural network structure provided in the present disclosure in terms of accuracy of recognition of multiple intent words, through experiments. Herein, the accuracy was calculated assuming that all the multiple intent words contained in the sentence were accurately recognized.

TABLE 1

| The number of intent words contained in a sentence | Conventional convolutional neural network | Convolutional neural network provided in the present disclosure |
|---|---|---|
| 1 | 0.986 (592/600) | 0.978 (587/600) |
| 2 | 0.972 (1458/1500) | 0.954 (1431/1500) |
| 3 | 0.968 (1936/2000) | 0.947 (1895/2000) |
| 4 | 0.948 (1422/1500) | 0.915 (1373/1500) |
| 5 | 0.688 (413/600) | 0.813 (488/600) |
| 6 | 0.58 (348/600) | 0.858 (515/600) |
| Average | 0.857 | 0.911 |

As shown in Table 1 above, it is found that averagely, the accuracy of the convolutional neural network provided in the present disclosure was high, and particularly, when the number of intent words contained in the sentence was large, performance was improved.

Figure 8:
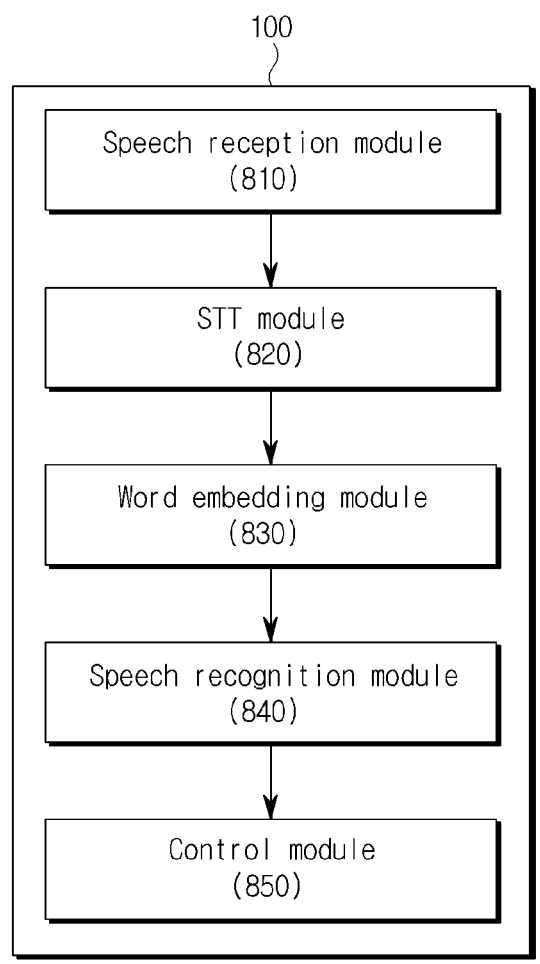
FIG. 8 is a block diagram illustrating elements operated by at least one processor of an electronic device 100, according to various embodiments.

FIG. 8 is a block diagram illustrating elements operated by at least one processor of an electronic device 100, according to various embodiments. The elements shown in FIG. 8 may be software programs or application modules executed by the processor 180, the learning processor 130 of FIG. 1, and/or the audio processor 181 shown in FIG. 5. Some configurations may be implemented by a separate chip, ASIC, or FPGA manufactured to execute only the configurations. In this case, the configurations may be considered as a hardware module. In addition, at least one processor may include a general-purpose processor, and a chip, an ASIC, or an FPGA manufactured to perform a particular function or configuration. The configuration shown in FIG. 8 is merely an embodiment. According to another embodiment, one element shown in FIG. 8 may be divided into several elements, or several elements may be combined into one element. In addition, according to another embodiment, part of the elements shown in FIG. 8 may be omitted, or an element not shown in FIG. 8 may be added.

Referring to FIG. 8, the electronic device 100 may include a speech reception module 810, an STT module 820, a word embedding module 830, a speech recognition module 840, and a control module 850.

According to various embodiments, the speech reception module 810 may receive talker's speech input through the microphone 122 of the input unit 120. According to an embodiment, the talker's speech may contain a starting word for activating a speech recognition function. Recognition of the starting word may be performed through separate operation, and further description thereof will be omitted because it departs from the scope of the present disclosure.

The speech reception module 810 may transmit the received speech to the STT module 820.

According to various embodiments, the STT module 820 may convert the speech data received from the speech reception module 810 into text data. The speech reception module 810 may increase the accuracy of speech-to-text conversion by using the language model. The STT module 820 may perform the same function as the STT server 81 described above.

According to an embodiment, the STT module 820 may transmit the speech data to the STT server 81 of the speech system 1 through the communication unit 110 without directly performing speech-to-text conversion, and may receive the text data, which is a result of converting the speech data, from the STT server 81. When the computing power of the electronic device 100 is insufficient, it is more efficient to use the external STT server 81.

The STT module 820 may transmit the text data to the word embedding module 830.

The word embedding module 830 may convert each character or word of the text data into embedding data. The embedding data may be data into which the character or word is converted in a particular form so as to enable the artificial neural network to efficiently acquire features. As an embodiment, the embedding data may be a matrix having N1 real numbers (N1 dimension). Accordingly, one character or one word may be represented by a 1×N1 matrix having N1 (for example, 50 or 100) real numbers.

According to an embodiment, the embedding data corresponding to each character or each word may be a preset value. Accordingly, the same embedding data may be set for the same characters. According to another embodiment, the embedding data may be newly generated each time on the basis of a separate artificial neural network. Accordingly, different embedding data may be set each time even for the same characters.

The word embedding module 830 may convert each character or word of the text data received from the STT module 820, into the embedding data. For example, the user's spoken speech, "rinse and spin-dry", may be converted into embedding data of a 5×N1 matrix.

The embedding data generated by the word embedding module 830 may be used as an input into the speech recognition module 840.

According to an embodiment, the word embedding operation may be performed by a separate external electronic device (for example, the STT server 81). When the computing power of the electronic device 100 is low, it is efficient to use the external electronic device for word embedding.

According to various embodiments, the speech recognition module 840 may identify at least one intent word on the basis of the convolutional neural network shown in FIG. 7. The speech recognition module 840 may receive, from the word embedding module 830, the input data 710 consisting of the embedding data corresponding to the speech spoken by the user, may perform processing on the basis of the algorithm shown in FIG. 7, and may identify and output at least one intent word contained in the speech spoken by the user.

According to an embodiment, the convolutional neural network model used by the speech recognition module 840 may already be subjected to learning. Through supervised learning in which the embedding data containing at least one intent word may be used as learning data, and in which a label indicating what intent word is contained in the embedding data is also provided, the convolutional neural network model shown in FIG. 7 may be subjected to learning. Such learning does not need to be real time, and learning may be performed in advance. According to an embodiment, the performance of the model already subjected to learning may differ depending on the type and/or the value of the embedding data corresponding to each character or word. Therefore, when the convolutional neural network model for recognizing multiple intent words is subjected to learning, learning about determining embedding data corresponding to each character or each word is also performed.

The speech recognition module 840 may transmit the identified intent word to the control module 850.

According to various embodiments, the control module 850 may receive the identified intent word and may perform control corresponding to the intent word. As an embodiment, when the control module 850 receives the intent word "power", the control module 850 turns the power of the electronic device 100 on so that the electronic device 100 is activated.

According to various embodiments, a speech recognition device includes a memory and at least one processor, wherein the memory stores a program for speech recognition, and the at least one processor may load the program stored in the memory to execute the program.

The program stored in the memory may cause the at least one processor to perform the following: receiving input data generated on the basis of talker's speech; performing a convolution operation on the input data and N3 filters each composed of N2 channels, and thus acquiring a feature map having N4 pieces of data for each channel of each filter; applying max pooling to the N4 pieces of data for each channel of each filter so as to acquire a representative value, and thus acquiring a feature map having N2 pieces of data for each filter; performing concatenation on the feature maps for the respective filters, and thus acquiring one feature map represented by an N3×N2 matrix; performing a convolution operation on the feature map of the N3×N2 matrix and a filter represented by a 1×N3 matrix, and thus acquiring a feature map represented by a 1×N2 matrix; and inputting the feature map of the 1×N2 matrix into an artificial neural network and thus acquiring at least one intent word.

According to various embodiments, the program stored in the memory may cause the at least one processor to further perform determining weights that the respective N2 channels of each of the N3 filters use, a weight that the filter represented by the 1×N3 matrix uses, and weights used in the artificial neural network, through iterative learning with forward and backward error propagation.

According to various embodiments, an electronic device (for example, the electronic device 100 in FIG. 1) may comprise a microphone (for example, the microphone 122 in FIG. 1) configured to receive talker's speech, an audio processor (for example, the audio processor 181 in FIG. 5) configured to preprocess the talker's speech received from the microphone and at least one processor (for example, the processor 180 or the learning processor 130 in FIG. 1) operatively connected to the audio processor.

According to various embodiments, the at least one processor may be configured to acquire speech data, convert the speech data into text data, convert the text data into embedding data, acquire a feature map having N4 pieces of data for each channel of each filter by performing a convolution operation on the embedding data and N3 filters each composed of N2 channels, acquire a feature map having N2 pieces of data for each filter by applying max pooling to the N4 pieces of data for each channel of each filter so as to acquire a representative value, acquire one feature map represented by an N3×N2 matrix by performing concatenation on the feature maps for the respective filters, acquire a feature map represented by a 1×N2 matrix by performing a convolution operation on the feature map of the N3×N2 matrix and a filter represented by a 1×N3 matrix and acquire at least one intent word by inputting the feature map of the 1×N2 matrix into an artificial neural network.

According to various embodiments, the electronic device may further comprise a communication unit, and the at least one processor may be configured to transmit the speech data to an external speech-to-text (STT) server through the communication unit and acquire the text data, which is a result of converting the speech data, from the STT server through the communication unit, whereby the speech data is converted into the text data.

According to various embodiments, the at least one processor may be configured to perform control or setting corresponding to the at least one intent word.

According to various embodiments, the N3 filters may be four filters; sizes of the four filters may be 3×N1, 4×N1, 5×N1, and 6×N1, respectively; and the N1 may denote a dimension of the embedding data and may have a value of 50 or 100.

According to various embodiments, the N2 may be 64 or 128, the N3 may be 4, and the N4 may be 256.

According to various embodiments, the at least one processor may be configured to determine weights that the respective N2 channels of each of the N3 filters use, a weight that the filter represented by the 1×N3 matrix uses, and weights used in the artificial neural network, through iterative learning with forward and backward error propagation.

Figure 9:
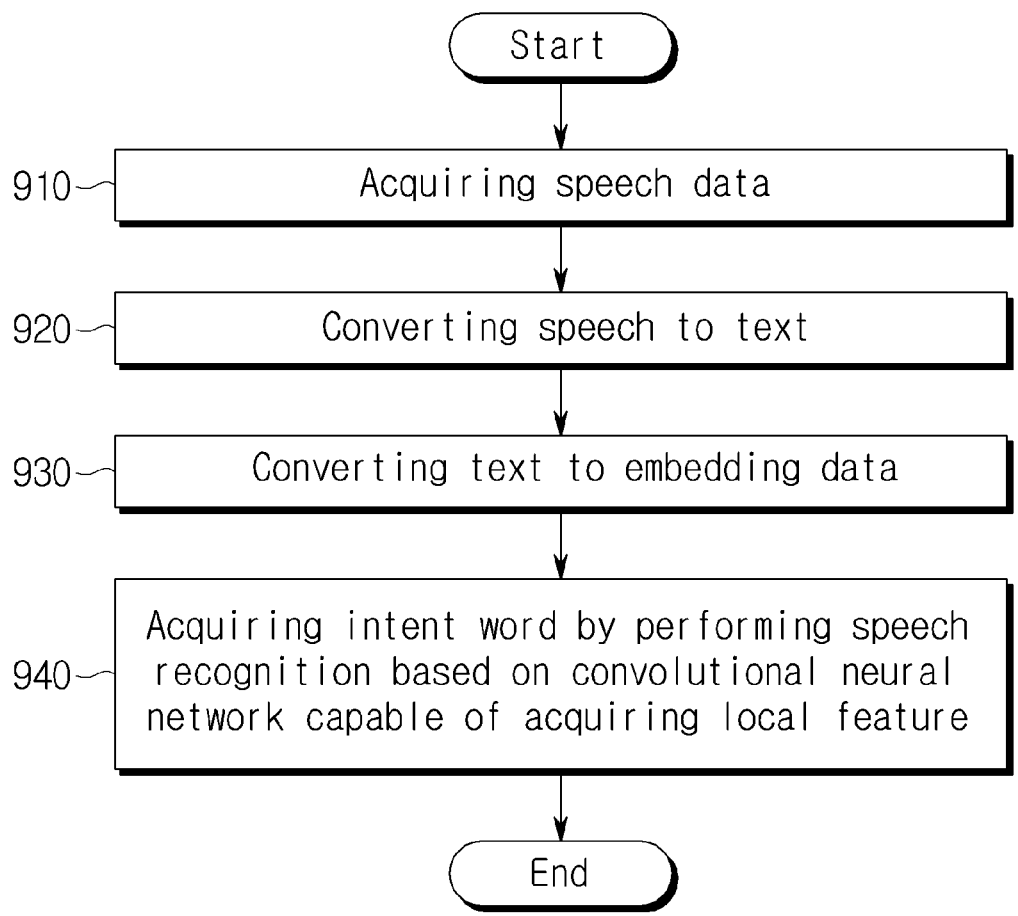
FIG. 9 is a flowchart illustrating a process in which an electronic device 100 acquires at least one intent word from talker's speech, according to various embodiments.

FIG. 9 is a flowchart illustrating a process in which an electronic device 100 acquires at least one intent word from talker's speech, according to various embodiments. The process according to the flowchart shown in FIG. 9 may be implemented by an electronic device (for example, the electronic device 100 in FIG. 1), or at least one processor (for example, the processor 180, the learning processor 130 in FIG. 1, or the audio processor 181 in FIG. 5) of an electronic device.

Referring to FIG. 9, at step 910, the electronic device 100 may receive talker's speech through the microphone 122 of the input unit 120. Speech data of the talker may contain may contain at least one intent word for controlling the electronic device 100 so that the electronic device 100 performs a particular function.

According to various embodiments, at step 920, the electronic device 100 may convert the received speech data into text data. According to an embodiment, the electronic device 100 may convert the speech data into the text data by using the external STT server 81.

According to various embodiments, at step 930, the electronic device 100 may convert the text data into embedding data. The embedding data may be data into which a character or word is converted in a particular form so as to enable the artificial neural network to efficiently acquire features. As an embodiment, the embedding data may be represented by a matrix having N1 real numbers.

According to various embodiments, at step 940, the electronic device 100 may acquire at least one intent word by performing speech recognition based on the convolutional neural network capable of acquiring a local feature shown in FIG. 7. Herein, the intent word may be a speech language capable of replacing a key input for controlling the electronic device, and a predetermined limited number of words.

Figure 10:
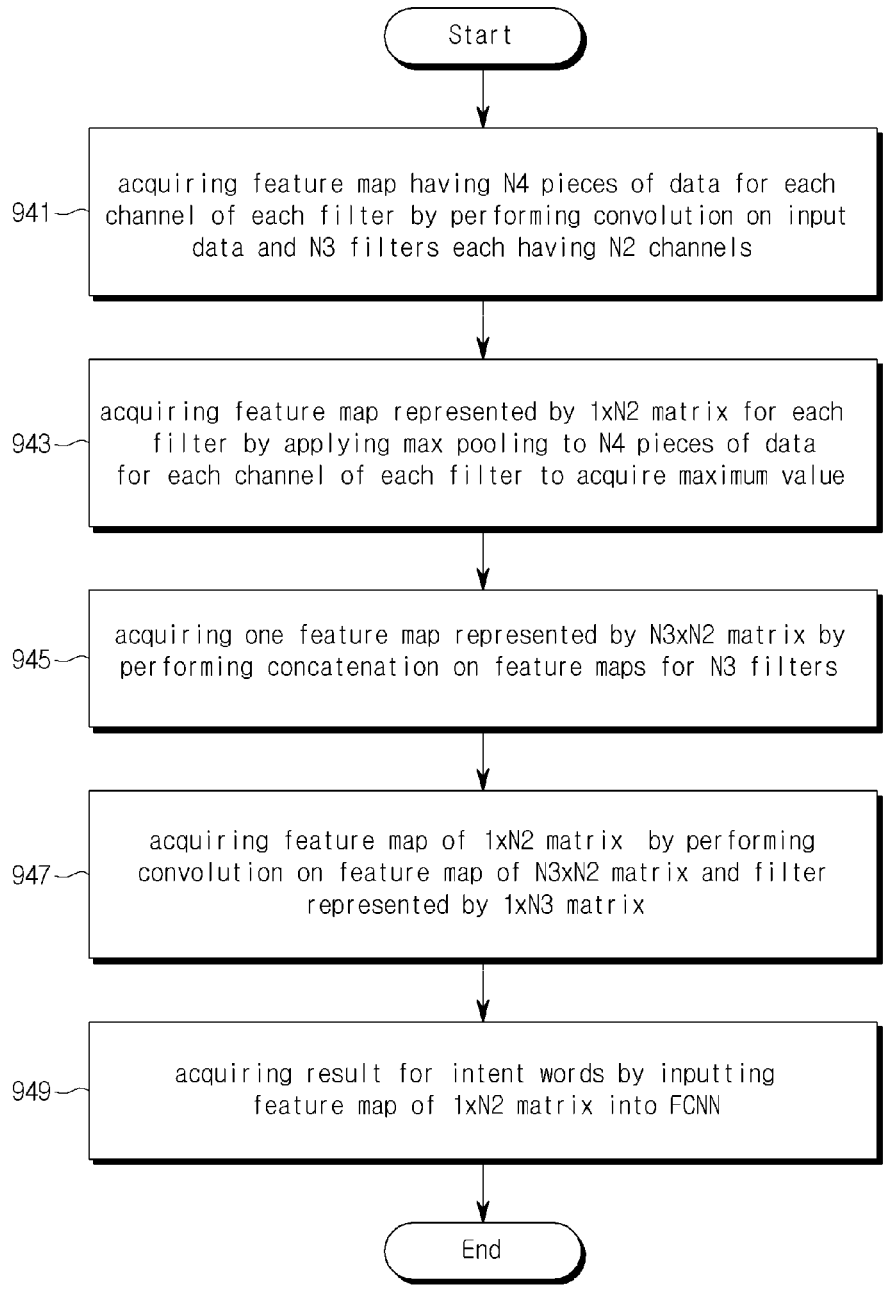
FIG. 10 is a flowchart illustrating a process of acquiring intent words by speech recognition based on a convolutional neural network that is capable of acquiring a local feature, wherein regarding description of the drawings, the same or similar elements are denoted by the same or similar reference numerals.

FIG. 10 is a flowchart illustrating a process of acquiring intent words by speech recognition based on a convolutional neural network that is capable of acquiring a local feature. The process according to the flowchart shown in FIG. 10 may be implemented by an electronic device (for example, the electronic device 100 in FIG. 1), or at least one processor (for example, the processor 180, the learning processor 130 in FIG. 1, or the audio processor 181 in FIG. 5) of an electronic device. The flowchart of FIG. 10 may be an embodiment of step 940 of FIG. 9.

Referring to FIG. 10, at step 941, the electronic device 100 performs a convolution operation on input data and N3 filters each composed of N2 channels and may then acquire a feature map having N4 pieces of data for each channel of each filter. According to an embodiment, N2×N3 feature maps each having N4 pieces of data may be acquired. The electronic device 100 may acquire various features that the input data has, by applying N2×N3 filters.

At step 943, the electronic device 100 may apply max pooling to the N4 pieces of data of each of the N2×N3 feature maps so as to acquire a representative value, and may use only the representative value, thereby reducing the number of data of the feature map. By this operation, each of the N2×N3 feature maps may have only one value that represents the largest feature. Accordingly, the size may be reduced into N3 feature maps each having N2 pieces of data.

At step 945, the electronic device 100 may perform concatenation on the feature maps for the N3 filters, and may then acquire one feature map represented by an N3×N2 matrix.

At step 947, the electronic device 100 may perform a convolution operation on the feature map of the N3×N2 matrix and a filter represented by a 1×N3 matrix, and may then acquire a feature map of a 1×N2 matrix. At this step, the features acquired through the respective filters may be integrated for each channel.

At step 949, the electronic device 100 may input the feature map of the 1×N2 matrix into the fully-connected artificial neural network to perform classification of the features, and may then acquire a result for the intent words. Herein, the fully-connected artificial neural network may be an artificial neural network in which learning is performed in advance through supervised learning that uses speech data containing various intent words as learning data.

The intent words acquired at step 949 may be recognized as a control command of the electronic device 100, and the electronic device 100 may operation an operation corresponding to the acquired intent words.

Referring to the above-described process of FIG. 10, in data of the feature maps, the features acquired by the N2 channels for each filter are not combined with each other but are maintained as they are. Accordingly, a local feature of the input data which is acquired by each channel and another local feature are not combined with each other but are maintained as they are, so that enhanced performance is provided in acquiring multiple intent words.

According to various embodiments, a speech recognition method may comprise receiving input data generated based on talker's speech, acquiring a feature map having N4 pieces of data for each channel of each filter by performing a convolution operation on the input data and N3 filters each composed of N2 channels, acquiring a feature map having N2 pieces of data for each filter by applying max pooling to the N4 pieces of data for each channel of each filter so as to acquire a representative value, acquiring one feature map represented by an N3×N2 matrix by performing concatenation on the feature maps for the respective filters, acquiring a feature map represented by a 1×N2 matrix by performing a convolution operation on the feature map of the N3×N2 matrix and a filter represented by a 1×N3 matrix and acquiring at least one intent word by inputting the feature map of the 1×N2 matrix into an artificial neural network.

According to various embodiments, the input data may be 50-dimensional to 100-dimensional embedding data generated based on the talker's speech.

According to various embodiments, the N3 filters may be four filters; sizes of the four filters may be 3×N1, 4×N1, 5×N1, and 6×N1, respectively; and the N1 may denote a dimension of the embedding data and may have a value of 50 or 100.

According to various embodiments, the N2 may be 64 or 128, the N3 may be 4, and the N4 may be 256.

According to various embodiments, the speech recognition method may further comprise determining weights that the respective N2 channels of each of the N3 filters use, a weight that the filter represented by the 1×N3 matrix uses, and weights used in the artificial neural network, through iterative learning with forward and backward error propagation.

According to various embodiments, a method of operating an electronic device (for example, the electronic device 100 in FIG. 1) may comprise acquiring speech data, converting the speech data into text data, converting the text data into embedding data, acquiring a feature map having N4 pieces of data for each channel of each filter by performing a convolution operation on the embedding data and N3 filters each composed of N2 channels, acquiring a feature map having N2 pieces of data for each filter by applying max pooling to the N4 pieces of data for each channel of each filter so as to acquire a representative value, acquiring one feature map represented by an N3×N2 matrix by performing concatenation on the feature maps for the respective filters, acquiring a feature map represented by a 1×N2 matrix by performing a convolution operation on the feature map of the N3×N2 matrix and a filter represented by a 1×N3 matrix and acquiring at least one intent word by inputting the feature map of the 1×N2 matrix into an artificial neural network.

According to various embodiments, the converting of the speech data into the text data may comprise transmitting the speech data to an external speech-to-text (STT) server through a communication unit and acquiring the text data, which is a result of converting the speech data, from the STT server through the communication unit.

According to various embodiments, the method may further comprise performing control or setting corresponding to the at least one intent word.

According to various embodiments, the N3 filters may be four filters; sizes of the four filters may be 3×N1, 4×N1, 5×N1, and 6×N1, respectively; and the N1 may denote a dimension of the embedding data and may have a value of 50 or 100.

According to various embodiments, the N2 may be 64 or 128, the N3 may be 4, and the N4 may be 256.

According to various embodiments, the method may further comprise determining weights that the respective N2 channels of each of the N3 filters use, a weight that the filter represented by the 1×N3 matrix uses, and weights used in the artificial neural network, through iterative learning with forward and backward error propagation.

The present disclosure provides a speech recognition device and method, and an electronic device including the speech recognition device, in which a convolutional neural network capable of recognizing a local feature of speech data is used so that at least one intent word is recognized and acquired from talker's speech. Particularly, the present disclosure can enhance the performance of acquiring multiple intent words from talker's speech.

Although a preferred embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. A speech recognition method comprising:
   receiving input data generated based on talker's speech;
   acquiring a feature map having N4 pieces of data for each channel of each filter by performing a convolution operation on the input data and N3 filters each composed of N2 channels;
   acquiring a feature map having N2 pieces of data for each filter by applying max pooling to the N4 pieces of data for each channel of each filter so as to acquire a representative value;
   acquiring one feature map represented by an N3×N2 matrix by performing concatenation on the feature maps for the respective filters;
   acquiring a feature map represented by a 1×N2 matrix by performing a convolution operation on the feature map of the N3×N2 matrix and a filter represented by a 1×N3 matrix; and
   acquiring at least one intent word by inputting the feature map of the 1×N2 matrix into an artificial neural network.

2. The speech recognition method of claim 1, wherein the input data is 50-dimensional to 100-dimensional embedding data generated based on the talker's speech.

3. The speech recognition method of claim 2, wherein the N3 filters are four filters,
   sizes of the four filters are 3×N1, 4×N1, 5×N1, and 6×N1, respectively, and
   the N1 denotes a dimension of the embedding data.

4. The speech recognition method of claim 1, wherein the N2 is 64 or 128,
   the N3 is 4, and
   the N4 is 256.

5. The speech recognition method of claim 1, further comprising:
   determining weights that the respective N2 channels of each of the N3 filters use, a weight that the filter represented by the 1×N3 matrix uses, and weights used in the artificial neural network, through iterative learning with forward and backward error propagation.

6. A speech recognition device comprising:
   a memory; and
   at least one processor,
   wherein the memory stores a program based on the method of claim 1, and
   the at least one processor loads the program stored in the memory and executes the program.

7. An electronic device comprising:
   a microphone configured to receive talker's speech;
   an audio processor configured to preprocess the talker's speech received from the microphone; and at least one processor operatively connected to the audio processor, wherein the at least one processor is configured to:

acquire speech data;

convert the speech data into text data;

convert the text data into embedding data;

acquire a feature map having N4 pieces of data for each channel of each filter by performing a convolution operation on the embedding data and N3 filters each composed of N2 channels;

acquire a feature map having N2 pieces of data for each filter by applying max pooling to the N4 pieces of data for each channel of each filter so as to acquire a representative value;

acquire one feature map represented by an N3×N2 matrix by performing concatenation on the feature maps for the respective filters;

acquire a feature map represented by a 1×N2 matrix by performing a convolution operation on the feature map of the N3×N2 matrix and a filter represented by a 1×N3 matrix; and acquire at least one intent word by inputting the feature map of the 1×N2 matrix into an artificial neural network.

8. The electronic device of claim 7, further comprising:

a communication unit, wherein the at least one processor is configured to transmit the speech data to an external speech-to-text (STT) server through the communication unit; and acquire the text data, which is a result of converting the speech data, from the STT server through the communication unit.

9. The electronic device of claim 7, wherein the at least one processor is configured to perform control or setting corresponding to the at least one intent word.

10. The electronic device of claim 7, wherein the N3 filters are four filters, sizes of the four filters are 3×N1, 4×N1, 5×N1, and 6×N1, respectively, and the N1 denotes a dimension of the embedding data.

11. The electronic device of claim 7, wherein the N2 is 64 or 128, the N3 is 4, and the N4 is 256.

12. The electronic device of claim 7, wherein the at least one processor is configured to determine weights that the respective N2 channels of each of the N3 filters use, a weight that the filter represented by the 1×N3 matrix uses, and weights used in the artificial neural network, through iterative learning with forward and backward error propagation.

13. A method of operating an electronic device, the method comprising:

acquiring speech data;

converting the speech data into text data;

converting the text data into embedding data;

acquiring a feature map having N4 pieces of data for each channel of each filter by performing a convolution operation on the embedding data and N3 filters each composed of N2 channels;

acquiring a feature map having N2 pieces of data for each filter by applying max pooling to the N4 pieces of data for each channel of each filter so as to acquire a representative value;

acquiring one feature map represented by an N3×N2 matrix by performing concatenation on the feature maps for the respective filters;

acquiring a feature map represented by a 1×N2 matrix by performing a convolution operation on the feature map of the N3×N2 matrix and a filter represented by a 1×N3 matrix; and acquiring at least one intent word by inputting the feature map of the 1×N2 matrix into an artificial neural network.

14. The method of claim 13, wherein the converting of the speech data into the text data comprises:

transmitting the speech data to an external speech-to-text (STT) server through a communication unit; and acquiring the text data, which is a result of converting the speech data, from the STT server through the communication unit.

15. The method of claim 13, further comprising:

performing control or setting corresponding to the at least one intent word.

16. The method of claim 13, wherein the N3 filters are four filters, sizes of the four filters are 3×N1, 4×N1, 5×N1, and 6×N1, respectively, and the N1 denotes a dimension of the embedding data.

17. The method of claim 13, wherein the N2 is 64 or 128, the N3 is 4, and the N4 is 256.

18. The method of claim 13, further comprising:

determining weights that the respective N2 channels of each of the N3 filters use, a weight that the filter represented by the 1×N3 matrix uses, and weights used in the artificial neural network, through iterative learning with forward and backward error propagation.

* * * * *